United States Patent Office 3,497,400
Patented Feb. 24, 1970

3,497,400
SOLDERING FLUX
John Joseph Stokes, Jr., Murrysville, and Robert Alfonso Cargnel, Export, Pa., assignors to Aluminum Company of America, Pittsburgh, Pa., a corporation of Pennsylvania
No Drawing. Filed Sept. 14, 1967, Ser. No. 667,668
Int. Cl. B23k 35/36
U.S. Cl. 148—23                                10 Claims

ABSTRACT OF THE DISCLOSURE

A soldering flux containing zinc chloride and ammonium fluoborate, the ammonium fluoborate constituting 0.5 to 33 percent by weight of the flux exhibits good soldering flux properties. As an example the coating of an aluminum and a copper member with a soldering flux containing zinc chloride, 0.5 to 25 percent by weight of ammonium fluoborate, and 0.5 to 25 percent by weight of ammonium chloride provides for a strong soldered joint when molten solder is applied to the flux coated members.

---

This invention relates to the joining of metal members by soldering. More particularly, the invention concerns an improved soldering flux and its use in the soldering of aluminum or copper to aluminum or copper or some other dissimilar metal. As generally used herein the expression "aluminum" refers to aluminum or any grade or alloy thereof containing predominantly elemental aluminum and the expression "copper" refers to copper or any grade or alloy thereof containing predominantly elemental copper.

In joining metal parts by various known soldering techniques, a soldering flux is often required. This soldering flux performs several functions. First, it promotes the creation of a sound joint by preventing the formation of oxide films during heating and also serves to remove any oxide film already present. The prevention of such oxide films is especially necessary when soldering aluminum to aluminum or to some other dissimilar metal, since aluminum has a natural affinity for oxygen, both in the solid and molten states. This affinity results in the formation of a hard, tenaciously clinging, refractory oxide film on the metal surface which will prevent wetting of the underlying metal by the solder.

In addition to breaking up of the oxide film on the surface of the metal, and protecting the fresh metal surface from reoxidation, the soldering flux must be capable of forming a uniform coating of proper thickness on the metal member and also act to reduce the surface tension of the molten solder, thereby facilitating wetting, flow, and capillarity of the solder over the prepared surface.

Another desirable property in a soldering flux is that it must be capable of being readily displaced from the solid metal by the liquid solder without leaving a corrosive residue and without attacking, more than superficially, the solid metal. This is especially true where the metal member to be soldered is in the form of stranded copper or aluminum cable because it becomes extremely difficult, if not impracticable, to remove by washing procedures, any corrosive flux residue which may be present within the strands of the cable. In order to achieve this aforementioned ready displacement without concurrent deposition of flux residue, the flux should be fluid below soldering temperature, and react at a temperature below the solder's liquidus.

Several reaction salt-type soldering fluxes have been heretofore proposed to obviate these difficulties. For example soldering fluxes containing zinc chloride, ammonium chloride, and an additional alkali metal halide or ammonium halide other than chloride have been proposed, either in dry form or mixed in a suitable solvent. However, the additional alkali metal halide or ammonium halide when added to the conventional zinc chloride, ammonium chloride flux has been found to either leave an undesirable corrosive halide residue on the metal surface or has resulted in a roughened surface on the finally joined members. The latter adverse effects are especially acute in soldering stranded aluminum or copper cable. Another disadvantage existing with the use of the known soldering fluxes in connection with stranded cable is poor corrosion resistance of the soldered joint as evidenced by a large increase in electrical resistance upon exposure to moist atmospheres.

Accordingly, an object of the invention is to provide an improved soldering flux for use in the soldering of metal members.

A further object of the invention is to provide an improved soldering flux in liquid form for soldering stranded metal cable.

A still further object of the invention is to provide an improved soldering flux having good fluidity, uniform flux coating characteristics, and good fluxing reaction, but which does not deposit a corrosive residue nor result in a roughened surface on the soldered members.

Yet another object of the invention is to provide an improved soldering method for joining metal members.

A still further object of the invention is to provide an improved method for soldering stranded metal cable which provides joints having stable electrical properties in humid atmospheres.

Other objects and advantages of the invention will become apparent to those skilled in the art from the following description of the invention.

In general, the soldering flux composition of the present invention consists essentially of zinc chloride and ammonium fluoborate. The ammonium fluoborate constitutes from about 0.5 to about 33 percent by weight of the flux. A preferred flux composition contains zinc chloride and 5 to 25 percent by weight of ammonium fluoborate. These flux compositions provide strong soldered joints, exhibit good fluxing characteristics, do not deposite corrosive residues, and do not result in a roughened surface on the soldered members. Although we do not intend to be limited to any particular theoretical explanation, we believe that the addition of the ammonium fluoborate to the zinc chloride provides, in some manner not altogether clear to us, the desired aforementioned soldering flux properties.

It is also desirable to include ammonium chloride in the flux. The ammonium chloride further increases, in some manner, the activity of the flux, improves the solder flow, and further provides for a bright metallic appearing surface on the soldered joint which bright surface is desirable in certain applications. The use of a flux composition containing zinc chloride, 0.5 to 25 percent by weight of ammonium fluoborate, and 0.5 to 25 percent by weight of ammonium chloride provides good results. Especially good results have been obtained using a flux composition containing zinc chloride, 0.5 to 10 percent by weight ammonium fluoborate, and 0.5 to 10 percent by weight ammonium chloride.

While ammonium chloride is desirably included in the flux, especially when soldering stranded aluminum or copper cable, various other known flux additives may also be included depending on the particular operating technique employed and the results desired. For example, in hot plate soldering applications the metal members to be soldered are in a substantially flat position and are merely soldered at any convenient angle to each other, which allows for effective washing of the soldered joint and therefore corrosive residues are avoided. In such applications, one or more of such additional additives such as metal halides, ammonium halide other than chloride, stannous halides, cadmium halides, etc. may be included in the flux in lieu of or in addition to the ammonium chloride.

The flux of the present invention may be used in powder, paste, or liquid form depending on the particular soldering technique being utilized. For certain soldering techniques such as in dip soldering of stranded metal cable, the flux is desirably mixed with a vehicle that will produce a uniform flux spread. The flux is prepared by simply mixing the desired amount of each of the flux constituents. Since each solid flux constituent in generally in th form of a fine powder or crystal, this is readily accomplished with conventional blenders. The prepared flux can then be mixed with the desired amount of the solvent. The solvents which have been found most useful for the flux are the short chain aliphatic alcohols such as methyl alcohol, n-propyl alcohol, iso-propyl alcohol, and n-butyl alcohols. The amount of solvent added depends primarily on whether the flux is used in a paste or liquid form.

The invention provides a method of joining metal members by soldering which comprises applying a coating of the described flux compositions to at least one of the members, and thereafter subjecting the member to the action of molten solder.

The flux can be applied and used with the customary soldering tools and apparatus. However, the flux of this invention is particularly useful in soldering by the so-called "dip soldering" method, where the portion of the metal member to be joined is simply dipped into the flux maintained in solution to coat the member, and subsequently removed from the flux solution and immersed in a molten solder bath. Such a dip soldering process can be employed to join the small strands of aluminum or copper battery cable wire into an electrical homogeneous unit and can also be used to solder terminals to multiple strand aluminum or copper battery wire. When the flux is applied in liquid form to stranded metal cable in such a dip soldering process, usually one to two pounds of flux is added to each one-half gallon to ten gallons of solvent. When the stranded cable is to be soldered to a terminal of open end lug construction it is often desirable to crimp or otherwise mechanically attach the terminal lug to the cable by a suitable crimping tool, etc. prior to applying the flux to the members. This allows the advantage of evenly coating both members the flux immersion further allows immersing the coated mechanically joined members in one step into the molten solder to produce the soldered joint.

The following specific examples are further illustrative of the invention. While these examples particularly describe the use of the flux in a dip soldering process for soldering stranded aluminum and copper cable components, it will be evident to those skilled in the art that the invention may be used in any soldering process, such as torch soldering, hot-plate soldering, etc., and is applicable for the soldering of brass, iron, steel and other metals dissimilar from aluminum and copper.

EXAMPLE 1

One pound of flux containing 20 percent by weight of ammonium fluoborate and 80 percent by weight of zinc chloride was dissolved in ½ gallon of methyl alcohol. The exposed end of an insulated battery cable consisting of 60 strands of .028″ diameter wire of electrical conductor grade aluminum having an aluminum content in excess of 99.6 percent was inserted into an open-end terminal lug of electrical grade copper. The lug was then crimped around the battery cable end, and the assembly was dipped in the flux solution. The assembly was then removed and immersed for 10 seconds in a molten 35% tin-65% zinc solder maintained at a temperature of 750° F. Then the assembly was removed and allowed to cool. The finally soldered aluminum to copper joint exhibited high joint strength, and no observable corrosive residue was present either in the soldered joint or in the wire strands immediately adjacent to the soldered joint. The joint further exhibited a smooth but frosted metallic appearing surface and stable electrical properties in moist atmospheres.

EXAMPLE 2

One pound of flux containing 1.5 percent by weight ammonium fluoborate, 4.5 percent by weight ammonium chloride, and 94 percent by weight zinc chloride was dissolved in ½ gallon of methyl alcohol. Each exposed end of an insulated 10 inch long battery cable consisting of 60 strands of .028″ diameter wire of electrical conductor grade aluminum having an aluminum content in excess of 99.6 percent was inserted into an open-end terminal lug of electrical grade copper. The lugs on each exposed end was then crimped around each battery cable end, and the assembly was dipped in the flux solution. The assembly was then removed and immersed for 10 seconds in a molten 35% tin-65% zinc solder maintained at a temperature of 750° F. Then the assembly was removed and allowed to cool. The finally soldered aluminum to copper joints exhibited high joint strength and no observable corrosive residue was present in the vicinity of the soldered joints. The joints further exhibited a smooth bright metallic appearing surface and stable electrical properties in moist atmospheres.

EXAMPLE 3

1.5 pounds of flux containing 10 percent by weight ammonium fluoborate and 10 percent by weight ammonium chloride, and 80 percent by weight zinc chloride was dissolved in 1 gallon of ethyl alcohol. The exposed end of an insulated battery cable consisting of 60 wire strands of electrical conductor grade aluminum having .020″ diameter was inserted into a copper terminal lug which was crimped around the cable end and dipped in the flux and immersed in the solder as in Example 2. The finally soldered aluminum to copper joint exhibited the same properties as that obtained in Example 2.

EXAMPLE 4

Two pounds of flux containing 4.5 percent by weight ammonium fluoborate and 4.5 percent by weight ammonium chloride, and 91 percent by weight zinc chloride was dissolved in 1 gallon of methyl alcohol. The exposed end of a battery cable consisting of electrical conductor grade copper wire strands each wire having .022″ diameter was inserted into a copper terminal lug of open end construction which lug was crimped around the cable end. The crimped assembly was then dipped in the flux solution. The assembly cable was then removed and immersed for 10 seconds in a molten 40% tin-60% zinc solder maintained at a temperature of 750° F., then removed and allowed to cool. The finally soldered copper to copper joint likewise exhibited the same properties as obtained in Example 2.

EXAMPLE 5

The procedure of Example 2 was followed except that each open-end terminal lug crimped around each exposed battery cable end was comprised of aluminum having an aluminum content in excess of 99.0 percent aluminum, plus small amounts of impurities, principally iron and silicon. The finally soldered aluminum to aluminum joints likewise exhibited the same properties as were obtained in Example 2.

The electrical resistance between the soldered aluminum to copper joints and between the aluminum to aluminum joints produced in Examples 2 and 5 was measured. The soldered articles of Examples 2 and 5 were then exposed to an atmosphere of 100 percent relative humidity at a temperature of 125° F. for 51 days. At the end of this period the electrical resistance of the soldered articles was measured and the results are tabulated below.

TABLE I

| | Initial resistance in micro-ohms | Resistance after exposure in micro-ohms | Percent change of resistance |
|---|---|---|---|
| Example Two—Al to Cu | 300.5 | 314.9 | 4.8 |
| Example Five—Al to Al | 313 | 333.7 | 6.0 |

The percentage of change of resistance is well within the standards set by battery manufacturers.

While various specific embodiments of the invention have been described above, these are illustrative only, and various procedural and compositional changes may be resorted to without departing from the scope of the invention.

What is claimed is:

1. A soldering flux consisting essentially of zinc chloride and ammonium fluoborate, said ammonium fluoborate constituting 0.5 to 33 percent by weight of said flux.

2. A soldering flux composition of claim 1 dissolved in a short-chain aliphatic alcohol.

3. A soldering flux in accordance with claim 1 wherein said ammonium fluoborate constitutes 5 to 25 percent by weight of said flux.

4. A soldering flux composition of claim 3 dissolved in a short-chain aliphatic alcohol.

5. A soldering flux consisting essentially of zinc chloride, ammonium fluoborate, and ammonium chloride, said ammonium fluoborate constituting 0.5 to 25 percent by weight of said flux, and said ammonium chloride constituting 0.5 to 25 percent by weight of said flux.

6. A soldering flux composition of claim 5 dissolved in an aliphatic short-chain alcohol.

7. A soldering flux in accordance with claim 5 wherein said ammonium fluoborate constitutes 0.5 to 10 percent by weight of said flux, and wherein said ammonium chloride constitutes 0.5 to 10 percent by weight of said flux.

8. A soldering flux composition of claim 7 dissolved in an aliphatic short-chain alcohol.

9. A flux composition useful in a soldering process consisting essentially of zinc chloride, ammonium fluoborate, and ammonium chloride, said ammonium fluoborate constituting 1 to 5 percent by weight of said flux, and said ammonium chloride constituting 1 to 5 percent by weight of said flux.

10. A soldering flux composition of claim 9 dissolved in an aliphatic short-chain alcohol.

References Cited

UNITED STATES PATENTS

| 322,223 | 7/1885 | Watkins | 148—24 |
| 417,309 | 12/1889 | Benson | 148—26 |
| 1,914,269 | 6/1933 | Liban | 148—26 |
| 2,478,944 | 8/1949 | Rising | 148—26 |
| 2,867,037 | 1/1959 | Lawton | 29—496 |
| 3,175,286 | 3/1965 | Cape | 148—26 |
| 3,330,028 | 7/1967 | Elbreder | 148—26 |

L. DEWAYNE RUTLEDGE, Primary Examiner

T. R. FRYE, Assistant Examiner

U.S. Cl. X.R.

29—495; 148—26